Figure 1:
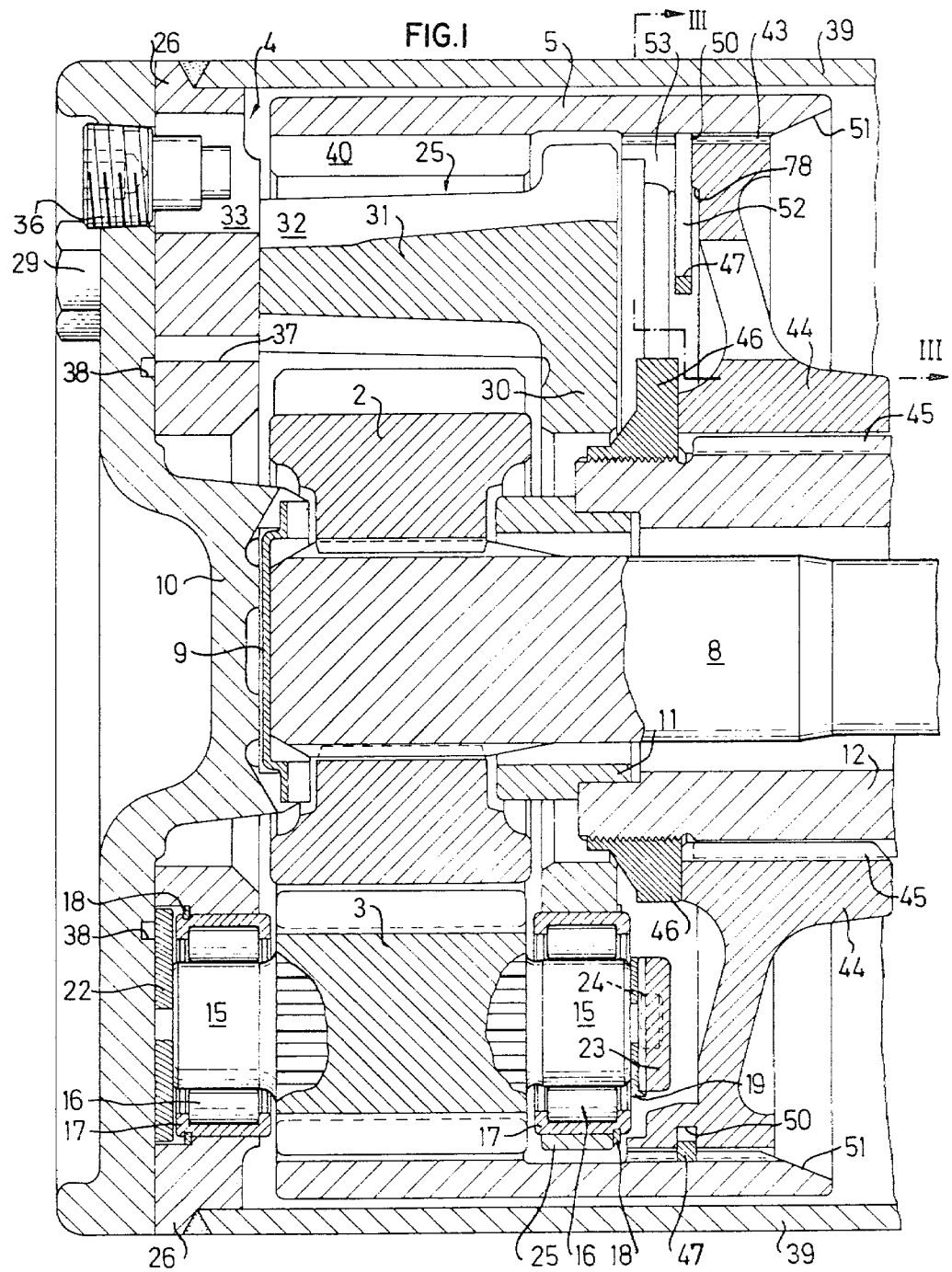

United States Patent [19]

Beijer et al.

[11] 4,270,412
[45] Jun. 2, 1981

[54] HUB GEAR FOR WHEELED VEHICLES

[75] Inventors: Per A. O. Beijer, Järna; Lars O. Strandås, Södertälje, both of Sweden

[73] Assignee: Saab-Scania Aktiebolag, Sodertalje, Sweden

[21] Appl. No.: 8,573

[22] Filed: Feb. 1, 1979

[30] Foreign Application Priority Data

Feb. 8, 1978 [SE] Sweden .................... 7801453

[51] Int. Cl.³ .................... F16H 1/28; F16H 35/00
[52] U.S. Cl. .................... 74/801; 74/391; 74/785; 74/788
[58] Field of Search .................... 74/801, 750 R, 785, 74/788, 391; 151/24

[56] References Cited

U.S. PATENT DOCUMENTS

| 2,543,811 | 3/1951 | Snow et al. | 74/801 |
| 3,071,090 | 1/1963 | Zeier | 74/785 X |
| 3,756,095 | 9/1973 | McCay, Jr. et al. | 74/801 |
| 4,037,694 | 7/1977 | Reese | 74/391 X |
| 4,142,615 | 3/1979 | Sidles et al. | 74/391 X |
| 4,158,972 | 6/1979 | Chamberlain | 74/801 |

FOREIGN PATENT DOCUMENTS

| 2548473 | 5/1976 | Fed. Rep. of Germany . |
| 329774 | 10/1970 | Sweden . |
| 393082 | 5/1977 | Sweden . |
| 1070716 | 6/1967 | United Kingdom . |

*Primary Examiner*—James Kee Chi
*Attorney, Agent, or Firm*—Cushman, Darby & Cushman

[57] ABSTRACT

A planet gear type hub gear for transmitting torque between a drive shaft and a vehicle wheel. The end portion of the drive shaft carries a sunwheel which cooperates with a plurality of planet wheels mounted on a planet wheel holder secured to the vehicle wheel. The planet wheels are meshing with a gear ring that is mounted on a fixed gear ring retainer, and that is locked axially on said retainer by means of at least one locking means. Said locking means engages grooves on both the gear ring and the gear ring retainer. In the planet wheel holder there is at least one passage via which the locking means can be operated by means of an elongate tool so as to make the gear ring, together with sunwheel planet wheels and planet wheel holder, axially removable from the gear ring retainer in a single unit enclosed by the hub casing.

5 Claims, 4 Drawing Figures

U.S. Patent  Jun. 2, 1981  Sheet 2 of 2  4,270,412

HUB GEAR FOR WHEELED VEHICLES

The present invention relates to a hub gear of the planet gear type for torque transmission between a drive shaft and a vehicle wheel, preferably on a lorry, said planet gear comprising a sunwheel non-rotatably connected to the end portion of the drive shaft, a plurality of planet wheels rotatably mounted on a planet wheel holder, at least an end portion of which is located inside the sunwheel, and which is non-rotatably connected to the vehicle wheel, and a gear ring non-rotatably connected to a non-rotating gear ring retainer that is located axially inward of the planet wheel holder, said gear ring being axially locked relative said retainer by means of at least one assembleable locking means radially attached between the gear ring and its retainer.

Such hub gears are known for use at relatively high gear ratios and/or low loadings. It has been possible to form them with the planet wheels journalled by means of needle bearings on axle necks and with a planet wheel holder carrying said axle necks and planet wheels completely accommodated in the gear ring. In dismantling such a hub gear, it is natural for the gear ring and other parts of the hub gear to be removed in separate operations. There is no particular problem with dismantling as long as the locking means, usually a circlip axially locking the gear ring to its retainer, is easily accessible when a hub casing surrounding the planet gear and certain parts of the hub gear have been drawn off the drive shaft.

In some types of wheel rims, however, the wheel hub lying inside the gear ring has a form which prevents accessibility to the circlip even when the hub casing is removed. Removal of the gear ring will then be a considerably more extensive operation, inter alia involving dismantling of the gear ring retainer. The problem of dismantling the hub gear is further accentuated when the planet wheels are made with fixed axle necks journalled in roller bearings on the planet wheel holder. Such mounting is utilized to advantage in hub gears intended for relatively low gear ratios and/or high loads, since this journalling method increases the strength of the hub gear. However, there is often the disadvantage that the gear ring and the planet wheel holder have a diameter relationship preventing the planet wheel holder being withdrawn from the gear ring before the axial lock between the gear ring and its retainer is released. In the cases where the circlip is accessible after removing the hub casing, dismantling of the hub casing from the planet wheel holder beforehand causes a time-waisting operation. So far, there has been no practical solution in use for dismantling the hub gear in those cases where the circlip is not accessible by removing the hub casing.

The present invention has the object of providing a hub gear of the kind described in the introductory paragraph, in which the above-mentioned deficiencies are taken care of, and where the gear is thus simple to both assemble and dismantle.

A hub gear according to the invention is characterized in that the locking means engates grooves on the gear ring and on the gear ring retainer, said locking means having at least one free inner portion which, when acted upon in a radial direction, releases the gear ring from its retainer, said planet wheel holder having at least one axial through-passage that, when the planet wheel holder has a certain rotational position relative to the free portion of the gear ring, allows access to the free portion of the locking means by a tool.

With the inventive hub gear, the axial lock for the gear ring can be released without taking apart the other portions of the gear beforehand. This is of great importance when dismantling takes place under unfavourable conditions, e.g. on a vehicle outdoors during the dark or in bad weather. The whole hub gear, with gear ring, sunwheel, planet wheels and planet wheel holder can be withdrawn from the drive shaft end and gear ring retainer in a single unit enclosed by the hub casing, and the continued dismantling of the component parts of the hub gear can take place under better working conditions, e.g. indoors.

Figure 2:
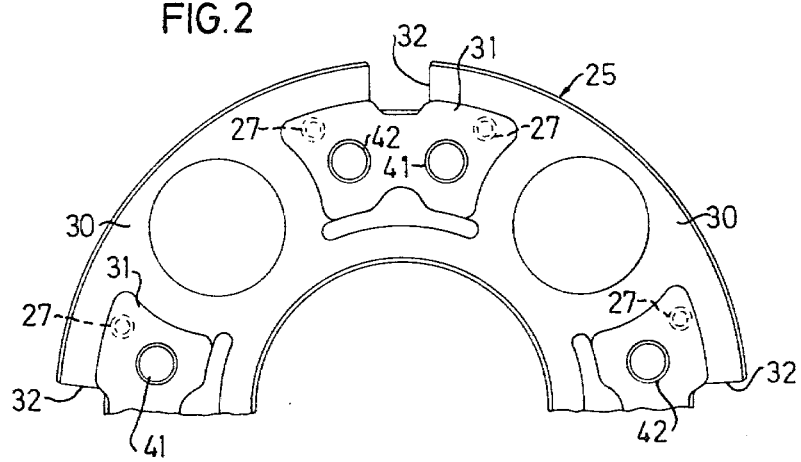
Figure 3:
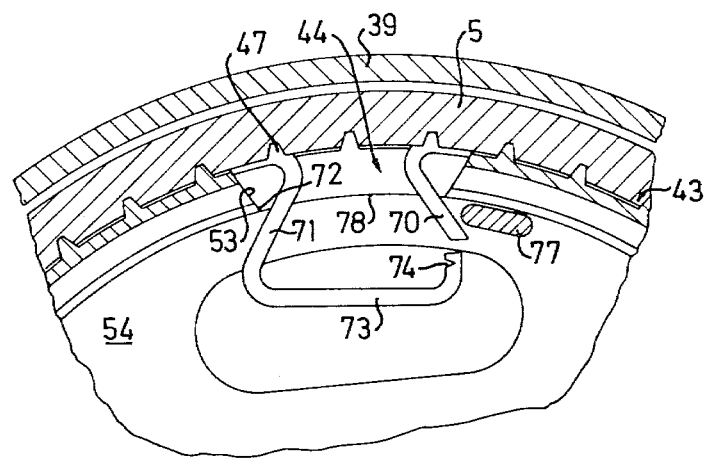
Figure 4:
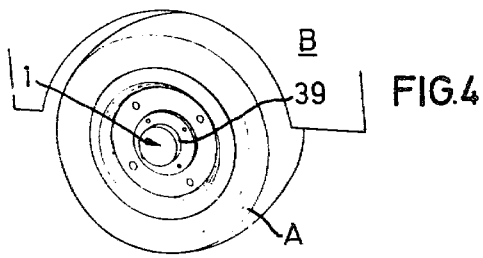

Other distinguishing features of the invention are apparent from the accompanying claims and from the following description in conjunction with the accompanying drawing of an embodiment exemplifying the invention, where FIG. 1 shows an inventive hub gear where a cross-section is taken through a planet wheel in the bottom half of the figure and through the planet wheel holder in the top half of the figure, FIG. 2 is an end view of one half of the inner planet portion of the planet wheel holder, FIG. 3 is a section III—III in FIG. 1, and FIG. 4 shows the hub gear at the wheel of a vehicle.

The hub gear 1, shown in FIG. 1, is located at the rear wheel A (FIG. 4) of a lorry B. The hub gear 1 is built up as a planet gear where a sunwheel 2 drives four planet wheels 3, rotatably mounted on a planet wheel holder 4, the planet wheels 3 meshing with a fixed gear ring 5. With the aid of splines, the sunwheel 2 is non-rotatably mounted on the end of the rear wheel drive shaft 8. The sunwheel 2 is axially locked in the outwards direction by means of a bearing washer 9 non-rotatably attached to an outer cover plate 10. The sunwheel 2 is axially fixed in the inwards direction by a cylindrical wear ring 11, fitted into a positionally fixed shaft tube 12 and locked to the outer end thereof by means of a locking pin (not shown). The shaft tube 12 is a portion of the back axle structure (not shown) of the lorry.

Each of the planet wheels 3 is formed with a fixed axle neck 15 at either end. The axle necks 15 are journalled in cylindrical roller bearings 16, the outer rings 17 of which are fixed in the planet wheel holder 4. The bearings 16 and planet wheels 3 are secured against axial movement by circlips 18 and spacing washers 19,22. The outer spacing washer 22 bears against the cover plate 10, while the inner washer 19 bears against a retainer 23 attached by two screws 24 (one screw being shown dashed in FIG. 1) to the planet wheel holder 4. The threaded holes 27 for the screws 24 in the axially inwardly facing end wall of the planet wheel holder 4 are illustrated by dashed lines in FIG. 2. The holes 27 are situated on either side of the bearing seats for the respective planet wheels 3. The retainer 23 thus bears against the outer ring 17 of the roller bearing 16 and prevents it from axial movement inwards.

The planet wheel holder 4 is composed of an inner holder part 25 and an outer ring part 26, these two parts being kept together by four hexagonal socket head screws (not shown). Threaded holes 41 for these screws in the inner holder part 25 are apparent from FIG. 2. The cover plate 10 is attached to the inner holder part 25 by screws 29, threaded into holes 42 in the inner holder part 25 after passing through open holes (not shown) in the outer ring part 26. The inner holder part 25 is provided with an inner ring part 30, having axially projecting support walls 31 arranged between the planet wheels 3, and provided with said threaded holes 41 and 42 at their free ends.

Each of the four support walls 31 is formed on its radially outer face with an axial, trough-like recess 32, open at the ends. The recesses 32 are in register with at least two holes 33, made in the outer ring part 26 and in the cover plate 10. The holes 33 are threaded in the cover plate 10 and can be plugged by screws 36. Changing lubricating oil in the hub gear 1 is enabled via the holes 33. Such oil is supplied to all the bearing locations in the hub gear and for this purpose the outer ring part 26 is provided with passages 37, coacting with annular grooves 38 in the cover plate 10.

A casing 39 is welded to the outer ring part 26. At its inner end (not shown) the casing 39 is connected by a screwed joint to the roadwheel hub (not shown), and it thus transmits torque from the planet wheel holder 4 to the roadwheel.

The gear ring 5 is formed with internal teeth 40 for meshing with the planet wheels 3. The gear ring 5 is non-rotatably mounted on an outer toothed circumference on a non-rotatable gear ring retainer 44 by means of a splines-like toothed connetion 43. The retainer is rigidly mounted on the previously mentioned shaft tube 12, via splines 45 and a nut 46 threaded onto the end of the shaft tube 12.

The gear ring 5 is locked against axial movement relative the retainer 44 by means of a circlip 47, arranged to coact with radial grooves on the toothed outer periphery of the retainer 44 as well as on the toothed inner periphery of the gear ring 5 coacting therewith. In order easily to get the circlip 47 in place in a locking attitude in a way to be described later, the axially inner end of the gear ring 5 is made with an interior bevel 51. The circlip 47 is formed as a substantially annular ring, but with a radially inwardly directed portion 52, projecting into a recess 53 in the toothed periphery of the retainer 44. The inwardly directed portion 52 of the circlip 47 is situated axially outside the support portion 54, between hub and toothed periphery of the retainer 44. As will be seen from FIG. 3, the inwardly directed portion 52 is formed by the two end portions 70,71 of the circlip 47. These are each bent backwards in the peripheral direction, and coact with the edges 72 of the recess 53 so that when a tangential force is applied to one end portion, the other end portion will be pressed against the edge 72 of the recess 53. This coaction of forces reduces the diameter of the circlip 47 and it can be thereby pressed into the groove 50 on the retainer 44. One end portion 71 of the circlip 47 is moreover formed with a forward-bent extension 73 which with a hook-like end comes close to the end of the other end portion 70. When the circlip 47 is compressed, said end portion 70 can latch in a nick 74 formed in the termination of the end portion 71, thereby keeping the circlip 47 in a pretensioned state. This state is utilized in fitting the hub gear 1.

Before fitting the hub gear 1, the retainer 44 and wear ring 11 have been attached to the shaft tube 12, and the circlip 47 has been placed in the groove 50 on the retainer 44 and has been pretensioned by the end portions 70,71 being latched onto each other. The whole of the hub gear 1 is assembled to a unit beforehand, this unit being then fitted over the end of the drive shaft 8 and over the peripheral teeth of the retainer 44. Since the circlip 47 thus assumes the pretensioned state, the outward edge thereof comes in direct contact with the bevel 51 on the gear ring 5, for pressing the circlip, during continued inward axial movement of the hub, successively into the groove 50 on the retainer 44. The end portions 70,71 of the circlip 47 are mutually released during this operation, at the final phase of fitting, the circlip 47 will thus snap into the groove in the gear ring 5 and lock it against axial movement relative to the retainer 44. The last phase of fitting the gear ring 5 is performed, in the embodiment shown, by using tools which are introduced through the two diametrically opposite holes 33, of which only one is shown in FIG. 1. After fitting, the casing 39 is attached to the roadwheel hub (not shown) and the screws 36 are screwed into the holes 33.

Dismantling the hub gear takes place in reverse order. After having rotated the wheel so that one of the screws 36 comes in the bottom position it is removed for emptying the oil in the hub gear. A long tool 77, e.g. a screwdriver, is then inserted through the hole 33 and recess 32. With the tip of the tool against the retainer 44, the hub gear is turned so that the tool 77 comes into engagement with one of the backwardly-bent end portions 70, 71, of the circlip 47. The tool 77 is subjected to a force directed radially outwards by said end portion during turning. A shoulder 78 on the retainer 44 provides, however, radial support for the end of the tool, and by exerting a further torque on the hub gear and thereby on the tool 77 as well, via the planet wheel holder 4, the end portions 70,71 of the circlip 47 can be pressed together to reduce the outside diameter of the circlip so that it no longer engages in the groove 50 on the gear ring 5. If an axially outward force is now applied to the hub gear casing 39 the entire hub gear can be withdrawn from the drive shaft 8 and gear ring retainer 44.

The invention has been found especially advantageous in hub gears having a diameter relationship between the planet wheel holder and gear ring as described in the above embodiment. The invention can also be applied to advantage in hub gears which do not have this diameter relationship, and within the purview of the inventive concept and following claims the invention is therefore not limited to the embodiment shown.

What we claim is:

1. A hub gear of the planet gear type, for torque transmission between a drive shaft and a vehicle wheel, preferably for a truck, said hub gear comprising a sunwheel non-rotatably connected to the end portion of the drive shaft, a plurality of planet wheels rotatably mounted on a planet wheel holder, said planet wheel holder being non-rotatably connected to the vehicle wheel and having at least an end portion located axially inward of the sunwheel, and a gear ring non-rotatably connected to a non-rotating gear ring retainer that is located axially inward of the planet wheel holder, said sunwheel and said gear ring both meshing with said planet wheels, said gear ring being axially locked relative to said retainer by means of at least one locking means radially attached between the gear ring and the gear ring retainer, the locking means engaging a groove on the gear ring and engaging another groove on the gear ring retainer, said locking means having at least one free portion which, when acted upon in a radial direction, releases the gear ring from the gear ring retainer, said planet wheel holder having at least one axial through-passage that, when the planet wheel holder has a certain rotational position relative to the gear ring, allows access to the free portion of the locking means by a tool.

2. A hub gear as claimed in claim 1, wherein the locking means is a substantially circular, resilient circlip having two end portions bent inwardly and forming together the inner portion of the circlip.

3. A hub gear as claimed in claim 2, wherein the end portions of the circlip are bent radially inwardly and backwardly in the peripheral direction so that the end portions form a radially outward acute angle.

4. A hub gear as claimed in claim 3, wherein one end portion of the circlip is bent double so that it can be latched onto the other end portion of the circlip, thereby pretensioning the circlip and reducing its diameter.

5. A hub gear as claimed in claim 2, 3 or 4, wherein the inner portion of the circlip is located axially outwardly of a support portion between the hub and peripheral toothing on the gear ring, said inner portion extending through a peripheral groove on the peripheral toothing of the gear ring retainer.

* * * * *